Figure 1:
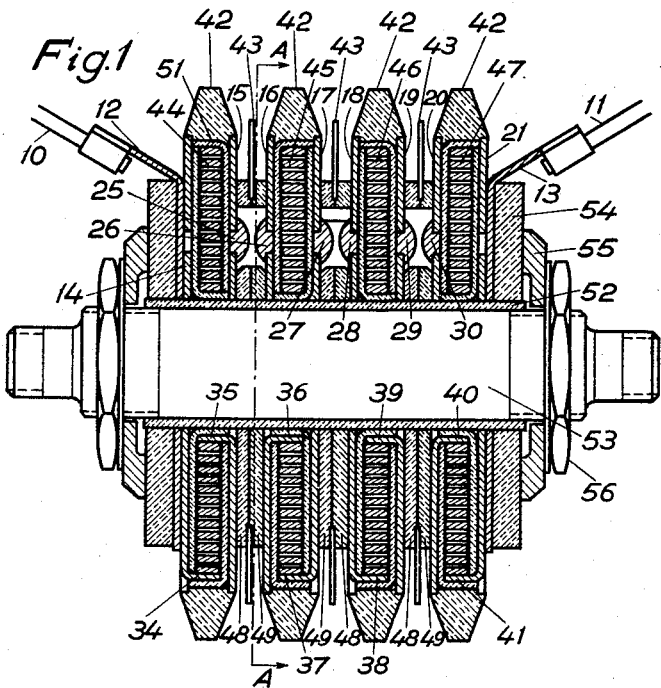

Oct. 20, 1959  B. THORÉN  2,909,694

OVER-VOLTAGE PROTECTIVE DEVICE

Filed Feb. 26, 1957

INVENTOR.
BERTIL THORÉN
BY
Attorney.

United States Patent Office 2,909,694
Patented Oct. 20, 1959

2,909,694

OVER-VOLTAGE PROTECTIVE DEVICE

Bertil Thorén, Ludvika, Sweden, assignor to Allmänna Svenska Elektriska Aktiebolaget, Vasteras, Sweden, a corporation of Sweden Application February 26, 1957, Serial No. 642,594

14 Claims. (Cl. 313—153)

This invention relates to an over-voltage protective device which is especially suitable for the protection of series capacitors in electrical power lines against over-voltages caused by abnormal currents arising from faults on the power line, or for equivalent protective purposes.

On the occasion of an earth fault or a short circuit on a power line the current in the faulty phase or the faulty phases becomes abnormally large, and, if the power line is provided with series capacitors, the high currents in the series capacitors give rise to over-voltages which might damage the capacitors if they are not limited to moderate values. In order to protect the capacitors against over-voltages of this sort, each capacitor battery was previously provided with a shunting spark gap which ignites at a certain allowed limit for the over-voltage and a by-pass switch, the operation of which is initiated by a current through the spark gap so that the spark gap is unloaded immediately after the ignition. The unloading of the spark gap has a double purpose, viz., partly to avoid burning of the spark gap and partly to allow for deionisation and cooling of the spark gap so that it has normal dielectric strength when the current in the line decreases to its normal value and the capacitor battery is again connected in.

It is evident that a substantial improvement of the protective device for a battery of series capacitors can be obtained in case the spark gap has the ability to stand the large currents, which must be led around the battery, for long intervals with a maintained stability of the ignition voltage and with an extinction voltage larger than the voltage across the battery of capacitors at normal current in the power line. The fact is that such an ideal spark gap usually need not be short-circuited by any by-pass switch, and the battery of capacitors is thus immediately re-connected when an over-voltage disappears, which is important to the stability in the transmission system. In an attempt to make a spark gap having the desired qualities it is possible to start from a known spark-gap construction in which the arc, by means of a magnetic field, is forced to move so quickly along the electrode surfaces that these cannot melt. By arranging the electrode surfaces and the magnetic field in such a way that the arc moves in a closed path, unlimited travel time may be obtained at moderate dimensions of the electrodes, but the requirement for a stable and low ignition voltage is found to be contrary to the requirement for high reignition voltage. In fact, if an ignition point is introduced between the main electrodes, it is found that it must be placed in a point of the largest possible magnetic field strength to ascertain that the arc is forced away from the ignition point before this is damaged. As the arc follows the maximum of the magnetic field, the arc will however pass through or close to the ignition point each time it has covered one turn in its closed path. The ignition point is for this reason kept ionised and at a high temperature so that the extinction voltage and the reignition voltage of the spark gap becomes very low.

According to the invention an over-voltage protective device having all the desired properties may be obtained by a shield of insulating material being arranged near to the ignition point in such a way that the ignition point is protected from the ionising effects from the arc when this moves along the closed path. The shield will normally froce the arc to deviate from its natural path in the vicinity of the ignition point. The over-voltage protective device becomes especially advantageous from a constructive point of view when the main electrodes are made from plain circular metal discs with central holes which are mounted on a tubular insulator together with disc-shaped coils producing a magnetic field having an axial-symmetric radial component between the main electrodes. More spark gaps may, in this case, be arranged in a row in direct series connection.

Figure 2:
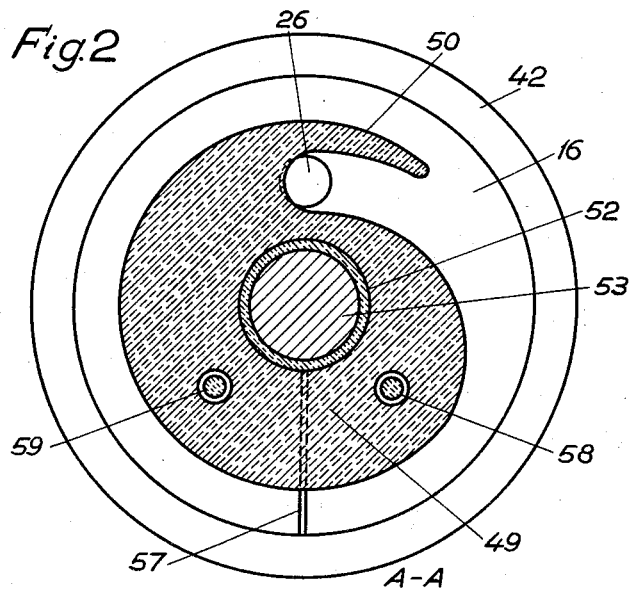

The mode of operation of the invention, as well as the advantages obtained by the mentioned form, is described in the following, with reference to the accompanying drawing in which, Figures 1 and 2 show two different sections through an over-voltage protective device according to the invention.

In Figure 1, 10 and 11 designate two conductors which are connected to a not shown apparatus or part of a power plant which is to be protected against over-voltage, e.g. a battery of series capacitors. The conductors 10 and 11 are, via connecting means 12 and 13 respectively, connected to an over-voltage protective device comprising three series connected spark gaps which are built up from circular electrode discs 14–21 being provided with ignition electrodes 25–30. The electrode discs are provided with central holes and are slid on an insulating tube 52 together with disc-shaped coils 44–47 having insulating outer rings 42 and insulating disc-shaped spacers 48, 49. The resulting pile is compressed by means of an iron bolt 53, which fits in the tube 52, and a nut 56 together with pressure rings 55 and insulating rings 54. Between each pair of insulating spacers 48, 49, a metal ring 43 is squeezed in. The disc-shaped coils 44–47 are, in Figure 1, shown as helixes of copper band with an insulation layer of paper or the like, but they may of course be made in other ways. Each coil is arranged between a pair of electrode discs from which it is insulated by means of insulating collars 51. The internal and external ends of the coils are, however, connected to each one of the electrodes which are provided with bent-down connecting lugs 34–41.

On the occasion of a voltage of sufficient magnitude being fed to the conductors 10 and 11, a spark-over occurs between the pairs of ignition electrodes 25, 26; 27, 28 and 29, 30, so that a current will flow from the conductor 10 through the connecting means 12 to the electrode disc 14 and from there via the connecting lug 34 to the external part of the coil 44. The current leaves the coil 44 at the connecting lug 35 of the electrode disc 15 with the ignition electrode 25 and passes via an arc to the electrode disc 16 with the ignition electrode 26, and from there it passes via the connecting lug 36 to the internal end of the coil 45. In the same way the current passes further between the electrode discs alternately through coils 45, 46 and 47 and through arcs between the electrode discs, 17, 18, and 19, 20 and leaves at the end the over-voltage protective device via the electrode 21, the connecting means 13 and the conductor 11.

In the space between the electrode discs, 15, 16; 17, 18, and 19, 20, magnetic fields arise which are substantially axial-symmetric and have large radial components, when the coils 44–47 pass current. Due to the fact that the coils 44–47 are alternately arranged to pass the current from the outside to the centre and from the centre to the outside, as will be evident from the arrangement of the connecting lugs 34–41, the radial field components from two adjacent coils are added in the space between the pair of electrode discs between the coils, while the axial components from the coils neutralize each other. The coils 44–47 are arranged in such a way that a current coming in at the conductor 10 gives rise to a radial, centrally directed field between the pair of electrodes 15, 16, a radial field directed outwards between the electrode pair 17, 18 and a radial field directed inwards between the pair of electrodes 19, 20.

An arc arising between, for instance, the ignition electrodes 25, 26, will, in known manner, be influenced by an electromagnetic force which is proportional to the current through the arc as well as to the magnetic field component at right angles to the arc and acts at right angles to the arc as well as to the magnetic field. As the arc is axially directed and the magnetic field is radially directed, this force will act on the arc in a tangential direction so that the arc is forced to move in the direction out from the surface of the paper in Figure 1. In the same way, an arc between the electrode discs 17, 18 will move in the direction into the surface of the paper, and an arc between the electrode discs 19, 20 will move in a direction out of the surface of the paper as viewed, immediately after the arc has risen between the ignition electrodes 27, 28 and 29, 30 respectively. Because the ignition electrodes 25–30 are shaped with a gradual transition from the ignition point where the spark-over distance is less, to the electrode discs where the spark-over distance is larger, the arcs can easily leave their ignition points, and because the electromagnetic force always influences the arcs in a tangential direction, the arcs will tend to move along the electrode surfaces following closed circular paths.

In order to avoid burning of the ignition electrodes the arcs must be made to move quickly out from the ignition point. The movement is facilitated by the mentioned shaping of the ignition electrodes, but the movement is always safer and quicker the stronger the radial component of the magnetic field at the ignition point. A powerful radial field component is ascertained through the shown construction and arrangement of the coils and because the iron bolt 53 serves as an efficient return path for the flux. In order that the field shall build up quickly after the ignition of the arc, the electrode discs 15–20 are further provided with radial slots 57 (Fig. 2) which prevent the arising of circulating, field destroying eddy currents. The strength of the radial field component varies, as is known, with the distance from the axis of the electrode system, partly because the flux crosses a larger cylinder surface when the distance increases, and partly because the radial magnetizing ampere turns decrease when the internal part of the coil is approached. Therefore a normally very broad maximum of radial field exists substantially where the ignition electrodes are arranged according to Fig. 1.

In the shown arrangement every precaution is made to protect the arc from fastening on the ignition point and the burning of the ignition electrodes is negligible even after a large number of ignitions. The arc will however, as mentioned, after the ignition tend to move along a circular path which is very stable when the arc is moving along the maximum radial field. In the case that the space between the electrode discs is empty, the arc will thus return to the ignition point at certain intervals so that the ignition point can never be deionised and cooled. According to the invention a shield of insulating material is, however, introduced between the electrode surfaces in such a way that the arc cannot influence the dielectric strength of the ignition point. This shield is in the shown form of the invention, made up of the insulating spacers 48, 49, the cross section of which is evident from Fig. 2, which shows the section through the axis of the electrode system designated A—A in Figure 1.

In Figure 2 the electrode disc 16 is seen with the said radial slot 57, which is suitably filled with an insulating material, the ignition electrode 26 and the insulating spacer 49. Further, the iron bolt 53 and the insulating tube 52 is seen in cross section, as well as a side view of the insulating ring 42 surrounding the coil 45 and preventing the spark-over of the arcs from one spark gap to another. Such a spark-over, which would decrease the extinction voltage, is further counteracted by the arcs in two adjacent spark gaps moving in different directions, as previously described. As will be evident from Figure 2, the insulating spacer 49 is shaped in such a way that it limits the movement towards the axis of the arc. In the neighbourhood of the ignition electrode 26 the insulating spacer 49 forms a helical channel outwards the path of the arc in the moving direction of the arc, which in Figure 2 is clockwise. The arc is thus forced to rotate in a path with a larger radius than that which corresponds to the distance from the ignition point to the axis. When the arc passes the ignition point, this is protected by the tongue 50 of the insulating spacer 49 against the ionizing radiation and the gas from the arc, and the ignition point is deionised and cooled quickly so that the reignition voltage becomes high.

When the arc is forced outwards by means of the insulating spacer 49, it encounters a metal ring 43 and is thus divided up into two shorter arcs. This results in an increased cooling of the arc and with this a high extinction voltage. A high extinction voltage can also, in known manner, be obtained when the metal ring 43 is substituted by an insulating ring which forces the arc to expand. Such an insulating ring should however be made open at the exit of the helical channel in the insulating spacers so that the movement of the arc along the electrode surfaces is not obstructed.

In order to prevent asymmetries which may result in premature ignition of the arcs, the overvoltage proctective device should be provided with an arrangement dividing the voltage equally between the spark gaps. This can for instance be obtained by means of high-ohmic resistors, which are arranged between the electrodes. In Fig. 2 two such resistance bodies 58, 59 are shown in section, being placed in holes in the insulating spacers 48 and 49. The precision of the ignition may further be improved when one or more of the ignition gaps are connected to a triggering arrangement of known construction.

The shown construction is suitable for the protection of direct current apparatus as well as alternating current apparatus, due to the fact that the direction of movement of the arc is independent of the polarity of the current. By a changed direction of current flow even the magnetic field changes its direction so that the electromagnetic force on the arc remains unchanged. When alternating current is flowing through the coils 44–47, one or more of these may, however, be short-circuited because a current is induced in the short-circuited coil by the field from adjacent coils, and this current gives rise to a magnetic field of wanted form and direction. Of course such a short circuited coil can entirely or partly be made from a ring of copper or any other highly conductive material.

I claim as my invention:

1. An overload protective device comprising two electrodes having surfaces facing each other over a substantial area, an ignition point carried by the surfaces of said electrode within said area for the ignition of an arc, means associated with said electrodes for supplying a magnetic field having a component perpendicular to the direction of said arc for moving the ignited arc along the electrode surfaces away from said ignition point and into and along a closed path within such area, and insulating means arranged between such surfaces and between said ignition point and the greater part of the closed path including the portion of the closed path nearest to the ignition point for shielding the ignition point from the arc moving along said closed path.

2. A device as claimed in claim 1, in which said electrodes are in the form of substantially plane, circular discs, and said magnetic field supplying means comprise an electric coil series connected with the discs, said coil supplying a field having a radial component in the space between the discs.

3. An over-voltage protective device according to claim 2, in which said coil is disc-shaped and is arranged co-axially with and adjacent to said electrodes, said electrode discs each having a radial slot for lowering the eddy current losses in the electrode.

4. An over-voltage protective device according to claim 2, in which said electrodes have central holes and are assembled together with said coil on a tubular insulator containing magnetic material.

5. An over-voltage protective device according to claim 2, in which said ignition point is arranged in the path of the arc, and said insulating means has a helical shape to limit radial movement of the arc towards the centre of said electrode discs and to force the arc to move away from the ignition point and to move outwardly towards said closed path.

6. An over-voltage protective device according to claim 2, said insulating means comprising a shield of insulating material between said electrodes and parallel to the surfaces thereof to force the arc to expand.

7. An over-voltage protective device according to claim 2, comprising shields of metal inserted between said electrodes and parallel to the surfaces thereof for dividing the arc into short partial arcs.

8. An over-voltage protective device according to claim 2, in which ignition point is exposed to the radial component of said magnetic field at a place where said component is at a maximum.

9. An over-voltage protective device according to claim 2, in which two disc-shaped electric coils are arranged co-axially with said electrodes and are spaced from each other by a pair of said electrodes, said pair of electrodes forming an arc-gap, and said coils producing magnetic fields the radial components of which co-act in said arc gap.

10. An over-voltage protective device according to claim 9, in which one of said coils has only one turn and if formed by a disc of highly conductive material.

11. An over-voltage portective device according to claim 1, in which said ignition point is a spark gap having a smaller spark-over distance than the remainder of the electrodes.

12. An over-voltage protective device according to claim 11, in which the spark-over distance of said spark gap increases gradually from the ignition point in the direction of the movement of the arc.

13. An over-voltage protective device according to claim 1, comprising a numebr of series connected electrode pairs, said magnetic field supplying means comprising a number of electric coils for producing magnetic fields having radial components in the spaces between said pairs series connected with said electrode pairs.

14. An over-voltage protective device according to claim 13 in which at least one of said series connected electrode pairs has an electrode connected to an arrangement for potential division.

References Cited in the file of this patent

UNITED STATES PATENTS

| | | |
|---|---|---|
| 470,721 | Thomson | Mar. 15, 1892 |
| 2,621,303 | Law | Dec. 9, 1952 |

FOREIGN PATENTS

| | | |
|---|---|---|
| 1,064,302 | France | May 12, 1954 |